USO10528968B2

(12) United States Patent
Good et al.

(10) Patent No.: US 10,528,968 B2
(45) Date of Patent: Jan. 7, 2020

(54) METHOD AND SYSTEM FOR POST AUTHORIZATION PAYMENT OF TRANSACTIONS USING LOYALTY POINTS

(71) Applicant: MasterCard International Incorporated, Purchase, NY (US)

(72) Inventors: William J. Good, Dardenne Prairie, MO (US); Kyle P. Clark, High Ridge, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 760 days.

(21) Appl. No.: 14/747,445

(22) Filed: Jun. 23, 2015

(65) Prior Publication Data
US 2016/0379242 A1 Dec. 29, 2016

(51) Int. Cl.
*G06Q 30/02* (2012.01)
*G06Q 20/08* (2012.01)
(Continued)

(52) U.S. Cl.
CPC ..... *G06Q 30/0233* (2013.01); *G06Q 20/0855* (2013.01); *G06Q 20/14* (2013.01);
(Continued)

(58) Field of Classification Search
CPC .......................... G06Q 30/0233; G06Q 20/40
(Continued)

(56) References Cited

U.S. PATENT DOCUMENTS

2008/0103968 A1\* 5/2008 Bies ...................... G06Q 20/06
705/39
2009/0319352 A1\* 12/2009 Boyle ................... G06Q 30/00
705/14.15
(Continued)

FOREIGN PATENT DOCUMENTS

JP 2010-170336 A 8/2010
JP 2010-286863 A 12/2010
(Continued)

OTHER PUBLICATIONS

Joseph C. Nunes, Your Loyalty Program Is Betraying You, 2006 (Year: 2006).\*
(Continued)

*Primary Examiner* — Tarek Elchanti
(74) *Attorney, Agent, or Firm* — Buchanan Ingersoll & Rooney PC

(57) ABSTRACT

A method for confirming post-authorization erasure of a transaction payment using reward points includes: storing account profiles including data related to reward accounts, each including an account identifier and point amount; receiving a transaction message associated with a payment transaction, the message including a specific account identifier and transaction amount; identifying a specific account profile that includes the specific account identifier; calculating a point cost based on the transaction amount; identifying an authorization reference key associated with the payment transaction and specific account profile; identifying a unique identifier associated with the authorization reference key;
(Continued)

storing an authorization record including authorization reference key and unique identifier; generating a request message including the identified unique identifier one of: the point cost and transaction amount; and transmitting the request message to a consumer associated with the specific account profile.

8 Claims, 9 Drawing Sheets

(51) Int. Cl.
  *G06Q 20/14* (2012.01)
  *G06Q 20/24* (2012.01)
  *G06Q 20/38* (2012.01)
  *G06Q 20/40* (2012.01)

(52) U.S. Cl.
  CPC ........... *G06Q 20/24* (2013.01); *G06Q 20/387* (2013.01); *G06Q 20/389* (2013.01); *G06Q 20/405* (2013.01); *G06Q 20/4014* (2013.01)

(58) Field of Classification Search
  USPC ................ 705/14.33, 14.32, 39, 44; 709/206
  See application file for complete search history.

(56) References Cited

U.S. PATENT DOCUMENTS

| | | | | |
|---|---|---|---|---|
| 2010/0057553 A1* | 3/2010 | Ameiss | ................ | G06Q 20/387 705/14.32 |
| 2010/0211504 A1* | 8/2010 | Aabye | ................... | G06Q 20/10 705/44 |
| 2010/0287244 A1* | 11/2010 | Wicks | .................. | G06Q 10/107 709/206 |
| 2015/0112780 A1 | 4/2015 | Guiney et al. | | |

FOREIGN PATENT DOCUMENTS

| | | | | |
|---|---|---|---|---|
| JP | 2014-178986 A | | 9/2014 | |
| KR | 100403426 B1 | * | 10/2003 | ............. G06Q 30/02 |
| RU | 2 343 542 C2 | | 1/2009 | |
| RU | 2 536 382 C2 | | 12/2014 | |

OTHER PUBLICATIONS

Notification of Transmittal of the International Search Report and the Written Opinion of the International Searching Authority (Forms PCT/ISA/220, PCT/ISA/210 and PCT/ISA/237) dated Aug. 9, 2016, by the Japanese Patent Office in corresponding International Application No. PCT/US2016/033036. (7 pages).

Extended European Search Report dated Oct. 29, 2018, by the European Patent Office in corresponding European Patent Application No. 16814906.0-1217. (10 pages).

Decision on Grant of a Patent for Invention dated Aug. 13, 2018 by the Russian Patent Office in corresponding Russian Application No. 2018102245, with an English translation of the Decision. (31 pages).

* cited by examiner

METHOD AND SYSTEM FOR POST AUTHORIZATION PAYMENT OF TRANSACTIONS USING LOYALTY POINTS

FIELD

The present disclosure relates to computerized systems for organizing and indexing of records and files in a manner that facilitate the retrieval of the records and files to facilitate post-authorization erasure of payment transactions using recorded reward points, specifically the issuing of a rebate message so that a consumer receives a rebate for a payment transaction after the authorization process has been completed but before a clearing process has been started using stored reward point values via data value matching using an authorization key and unique identifier.

BACKGROUND

In an effort to increase revenue, many merchants, manufacturers, retailers, and additional entities may offer consumers a reward or loyalty program. For instance, many merchants may have a specialized loyalty program where a consumer may receive discounts, earn reward or loyalty points, and receive additional perks. In another example, many payment card issuers offer payment cards to consumers where use thereof can earn various reward points or other types of benefits from use of the payment card, such as cash back, airline miles, etc. These reward programs can often encourage a consumer to use a specific payment method, visit a specific merchant, purchase items by a specific manufacturer, etc.

However, a vast number of these reward programs often require a consumer to redeem their reward points ahead of a transaction. For instance, the consumer may be required to indicate that they want to make a purchase using their reward points prior to even initiating the transaction, or may be required to indicate reward points when selecting a payment method for a transaction. As a result, many consumers may be unaware of their ability to fund certain payment transactions with reward points, and may therefore be missing out on potential savings and opportunities.

As a result, some methods have been developed to provide a consumer with the opportunity to "erase" a prior transaction using reward points. These methods operate by enabling a consumer to use reward points to get a rebate on a transaction that has previously been settled and cleared. To do so, the consumer uses an interface, such as via a website or an application program on a consumer device, to select a specific transaction and receive a rebate for set number of reward points. However, consumers that are likely to forget to use reward points to fund a transaction may be just as likely to forget to seek out a transaction much later, after clearing, to use their reward points after the fact to erase the transaction. In addition, clearing and settlement processes can often take a number of days, which may negate the benefits of erasing a transaction as the consumer's funds would be tied up during the duration. Consumers may therefore be more encouraged to use their reward points for cash back or other rewards, and may fail to take advantage of the ability to erase a transaction.

Thus, there is a need for a technical solution to provide improvements to the computer systems for erasing a payment transaction using reward points. Specifically, there is a need for a better system that provides for stronger tracking of eligible payment transactions, erasure of payment transactions directly after authorization of the transaction, and where erasure is initiated by the system itself and not the cardholder. These technical improvements may result in a system that is significantly easier for a consumer to use, more effective, and thus resulting in a higher usage rate and thereby more benefits to entities involved.

SUMMARY

The present disclosure provides a description of systems and methods for post-authorization erasure of payment transactions using reward points.

A method for confirming post-authorization erasure of a transaction payment using reward points includes: storing, in an account database, a plurality of account profiles, wherein each account profile includes data related to a reward account including at least an account identifier, a point amount, and contact information; receiving, by a receiving device, a transaction message associated with a payment transaction, wherein the transaction message includes at least a specific account identifier and a transaction amount; identifying, by a processing device, a specific account profile stored in the account database where the included account identifier corresponds to the specific account identifier included in the received transaction message; calculating, by the processing device, a point cost based on at least the transaction amount included in the received transaction message; identifying, by the processing device, an authorization reference key, wherein the authorization reference key is associated with the payment transaction and the identified specific account profile; identifying, by the processing device, a unique identifier, wherein the unique identifier is associated with the authorization reference key; storing, in a record database, an authorization record, wherein the authorization record includes at least the identified authorization reference key and the identified unique identifier; generating, by the processing device, a request message, wherein the request message includes at least the identified unique identifier and at least one of: the calculated point cost and the transaction amount included in the received transaction message; and transmitting, by a transmitting device, the generated request message to a consumer associated with the identified specific account profile based on the included contact information.

A method for post-authorization erasure of a transaction payment using reward points includes: storing, in an account database, a plurality of account profiles, wherein each account profile includes data related to a reward account including at least an account identifier and a point amount; storing, in a record database, a plurality of authorization records associated with payment transactions, wherein each authorization record includes at least an authorization key associated with a specific account profile and a unique identifier; receiving, by a receiving device, an erasure confirmation message, wherein the erasure confirmation message indicates confirmation for erasure of a payment transaction using reward points, the erasure confirmation message including at least a specific unique identifier; identifying, by a processing device, a specific authorization record in the record database where the included unique identifier corresponds to the specific unique identifier; identifying, by the processing device, a specific account profile in the account database based on the included account identifier and the authorization key included in the identified specific authorization record; deducting, by the processing device, a point cost associated with the payment transaction from the point amount included in the identified specific account profile; generating, by the processing device, a transaction message, wherein the transaction message is a request for rebate of a transaction amount of the payment transaction; and transmitting, by a transmitting device, the generated transaction message to a payment network.

A system for confirming post-authorization erasure of a transaction payment using reward points a record database, an account database, a receiving device, a processing device, and a transmitting device. The account database is configured to store a plurality of account profiles, wherein each account profile includes data related to a reward account including at least an account identifier, a point amount, and contact information. The receiving device is configured to receive a transaction message associated with a payment transaction, wherein the transaction message includes at least a specific account identifier and a transaction amount. The processing device is configured to: identify a specific account profile stored in the account database where the included account identifier corresponds to the specific account identifier included in the received transaction message; calculate a point cost based on at least the transaction amount included in the received transaction message; identify an authorization reference key, wherein the authorization reference key is associated with the payment transaction and the identified specific account profile; identify a unique identifier, wherein the unique identifier is associated with the authorization reference key; store, in the record database, an authorization record, wherein the authorization record includes at least the identified authorization reference key and the identified unique identifier; and generate a request message, wherein the request message includes at least the identified unique identifier and at least one of: the calculated point cost and the transaction amount included in the received transaction message. The transmitting device is configured to transmit the generated request message to a consumer associated with the identified specific account profile based on the included contact information.

A system for post-authorization erasure of a transaction payment using reward points includes an account database, a record database, a receiving device, a processing device, and a transmitting device. The account database is configured to store a plurality of account profiles, wherein each account profile includes data related to a reward account including at least an account identifier and a point amount. The record database is configured to store a plurality of authorization records associated with payment transactions, wherein each authorization record includes at least an authorization key associated with a specific account profile and a unique identifier. The receiving device is configured to receive an erasure confirmation message, wherein the erasure confirmation message indicates confirmation for erasure of a payment transaction using reward points, the erasure confirmation message including at least a specific unique identifier. The processing device is configured to: identify a specific authorization record in the record database where the included unique identifier corresponds to the specific unique identifier; identify a specific account profile in the account database based on the included account identifier and the authorization key included in the identified specific authorization record; deduct a point cost associated with the payment transaction from the point amount included in the identified specific account profile; and generate a transaction message, wherein the transaction message is a request for rebate of a transaction amount of the payment transaction. The transmitting device is configured to transmit the generated transaction message to a payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
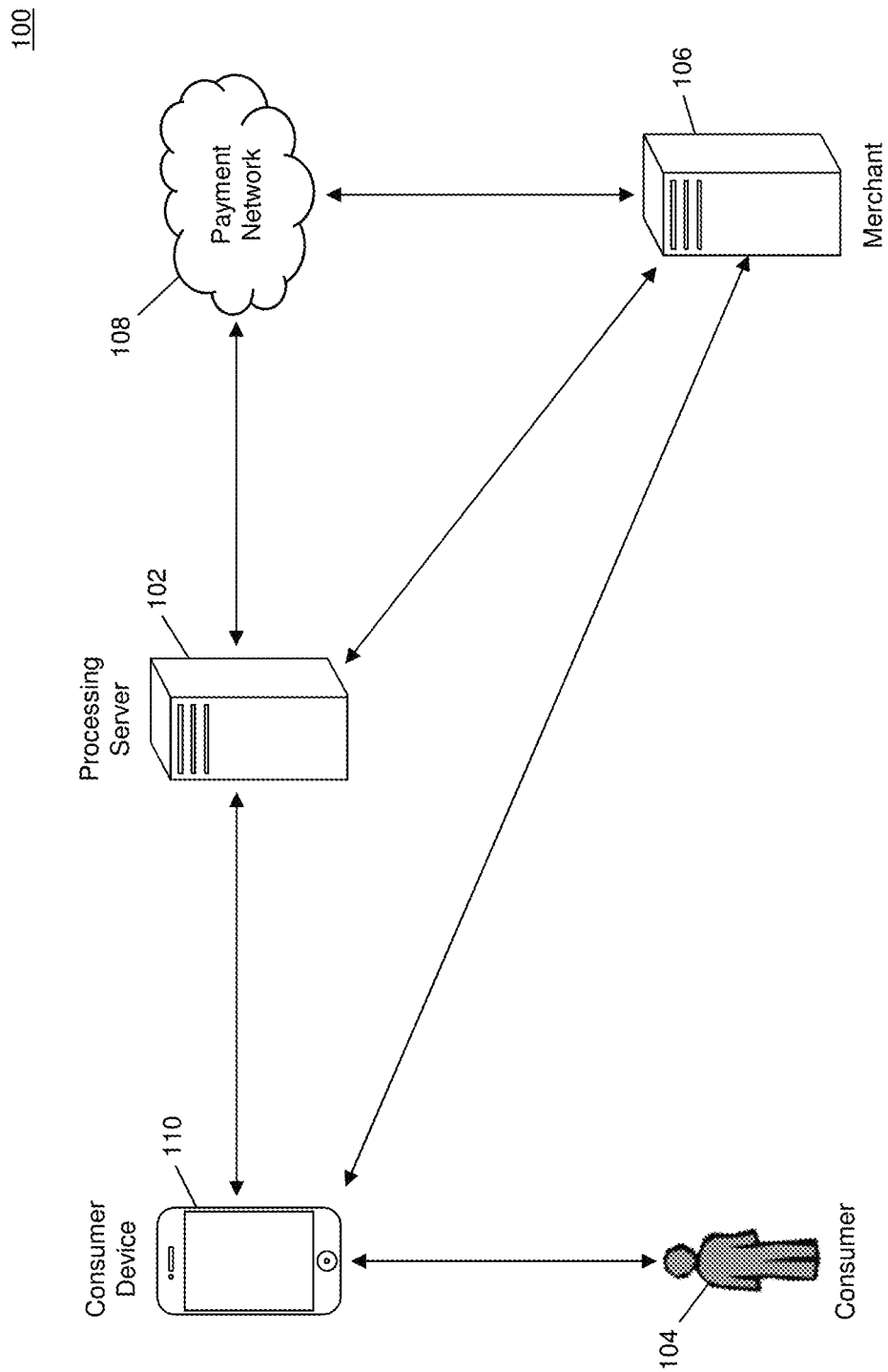
FIG. 1 is a block diagram illustrating a high level system architecture for post-authorization erasure of payment transactions using reward points in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Post-Authorization Erasure of Payment Transactions

FIG. 1 illustrates a system 100 for the post-authorization erasure of payment transactions using reward points.

The system 100 may include a processing server 102. The processing server 102, discussed in more detail below, may be configured to initiate erasure of payment transactions after authorization using reward points. In some embodiments, the erasure of payment transactions may occur prior to settlement or clearing of the payment transactions.

In the system 100, a consumer 104 may conduct a payment transaction with a merchant 106. The payment transaction may be funded by any suitable payment method, such as via a payment card, check, etc. Details for the payment transaction may be transmitted by the merchant 106 (e.g., directly or via a financial institution, such as an acquiring bank) to a payment network 108 in the form of a transaction message. A transaction message may be formatted based on one or more associated standards, such as the International Organization for Standardization's ISO 8583 standard.

The payment network 108 may receive the transaction message, which may be, for instance, an authorization request (e.g., as indicated in a message type indicator included therein) and may perform authorization of the payment transaction using methods and systems that will be apparent to persons having skill in the relevant art. For instance, the payment network 108 may contact a financial institution associated with the consumer 104 based on the payment method used to fund the transaction. For example, if the consumer 104 uses a payment card, the payment network 108 may contact a financial institution that issued the consumer 104 the payment card, such as an issuing bank, to approve the transaction (e.g., based on available credit, fraud rules, etc.).

Once authorization has been completed by the payment network 108, the payment network 108 may forward the transaction message to the processing server 102. In some embodiments, the processing server 102 may be a part of the payment network 108. In a further embodiment, the processing server 102 may be configured to process payment transactions as part of the payment network 108. In such an embodiment, the transaction message may be received by the processing server 102 from the merchant 106 and/or a financial institution associated with the merchant, such as for use in processing the corresponding payment transaction.

The processing server 102 may, as discussed in more detail below, identify an account profile associated with the consumer 104 based on data included in the received transaction message. The processing server 102 may identify reward points available for use by the consumer 104, and may determine if the payment transaction is eligible for erasure by the consumer 104. Eligibility may be based on, for instance, the transaction amount for the payment transaction, available reward points for the consumer 104, rules and limitations associated with the reward account, rules and limitations associated with the transaction or an entity involved therein (e.g., the merchant 106, acquirer, issuer, etc.). If the transaction is eligible for erasure, the processing server 102 may generate an authorization reference key associated with the payment transaction and the account profile of the consumer 104, and may also generate a unique identifier associated with the authorization reference key.

The processing server 102 may then transmit a message to the consumer 104 that includes the unique identifier and transaction details for the payment transaction that indicates to the consumer 104 that the transaction is eligible for erasure. In some embodiments, the message may be transmitted to a consumer device 110 associated with the consumer 104 using stored contact information. The consumer device 110 may be, for example, a desktop computer, laptop computer, notebook computer, tablet computer, cellular phone, smart phone, smart watch, wearable computing device, implanted computing device, embedded computing device, smart television, etc. The message may be transmitted to the consumer 104 via any suitable method, such as short messaging service, multimedia messaging service, e-mail, telephone, an application program, etc.

The consumer 104 may receive the message and may respond to the message indicating an approval for erasure of the payment transaction using reward points. The approval may be included in a response that may be transmitted to the processing server 102 via the consumer device 110 using the same method as delivery of the first message, or may be sent using any suitable method. In some embodiments, the consumer 104 may be required to respond within a predetermined period of time (e.g., 48 hours), as indicated in the message provided by the processing server 102. In such embodiments, the predetermined period of time may be less than an estimated time for clearing and settlement of the transaction.

The processing server 102 may receive the response from the consumer 104 and may then deduct the corresponding reward amount from the consumer's account profile, and may initiate payment of a rebate to the consumer's transaction account to erase the payment transaction. The processing server 102 may track the consumer's response to the appropriate transaction via the unique identifier and may, via the authorization reference key, ensure that the appropriate account profile is used for point deduction and appropriate transaction account refunded via the erasure. In addition, the use of authorization reference keys and unique identifiers may ensure that the correct transactions are dealt with according to consumer instructions in instances where the consumer 104 may have received multiple messages for transaction erasures that have time remaining for a response. For example, if the consumer 104 conducts three payment transactions in a short period of time, and receives an erasure message for each, the use of the authorization reference key and unique identifier may ensure that each transaction is processed correctly based on consumer instructions.

In some embodiments, the processing server 102 may be configured to provide for partial erasure of payment transactions post authorization. In such an embodiment, a payment transaction may be eligible if the consumer 104 has a suitable number of reward points eligible for a partial erasure (e.g., as set forth by an issuer, acquirer, the merchant 106, etc.). In such embodiments, the consumer 104 may respond to the erasure message with a desired erasure amount, which may be a reward point amount, a transaction amount, a percentage, or other suitable value. The processing server 102 may then deduct the corresponding point amount from the consumer's account profile and may initiate a rebate for the appropriate transaction amount, with the remaining transaction amount going through the traditional clearing and settlement processes.

The methods and systems discussed herein may enable consumers 104 to erase payment transactions after authorization of the transaction using reward points in a more efficient and expedited manner than is available using traditional systems. By performing the erasure after authorization of the transaction, the processing server 102 may ensure that the consumer's funds are not tied up for as long as in traditional systems, and may be able to process rebates and reward transactions faster than in traditional systems that must wait until clearing and settlement are completed. In addition, by using unique identifiers and reference keys, the processing server 102 may more easily track transactions and erasures such that multiple transactions may be considered by a consumer 104 at any given time, and may also provide the consumer 104 with the ability to erase transactions more easily by requiring less data to proceed in an erasure. For instance, because the processing server 102 may not require any information beyond the unique identifier to perform an erasure, the consumer's instruction may use less data and may therefore be transmitted using a number of methods unavailable in traditional systems. In addition, the use of less data may increase processing speed and efficiency, thereby using less system resources. Furthermore, the use of a unique identifier in addition to an authorization reference key may ensure that no sensitive financial data, such as account numbers, are transmitted to achieve the presently claimed methods and cannot be compromised by a nefarious entity. As a result, the methods and systems discussed herein provide a significant number of technical advantages over traditional systems.

Processing Server

Figure 2:
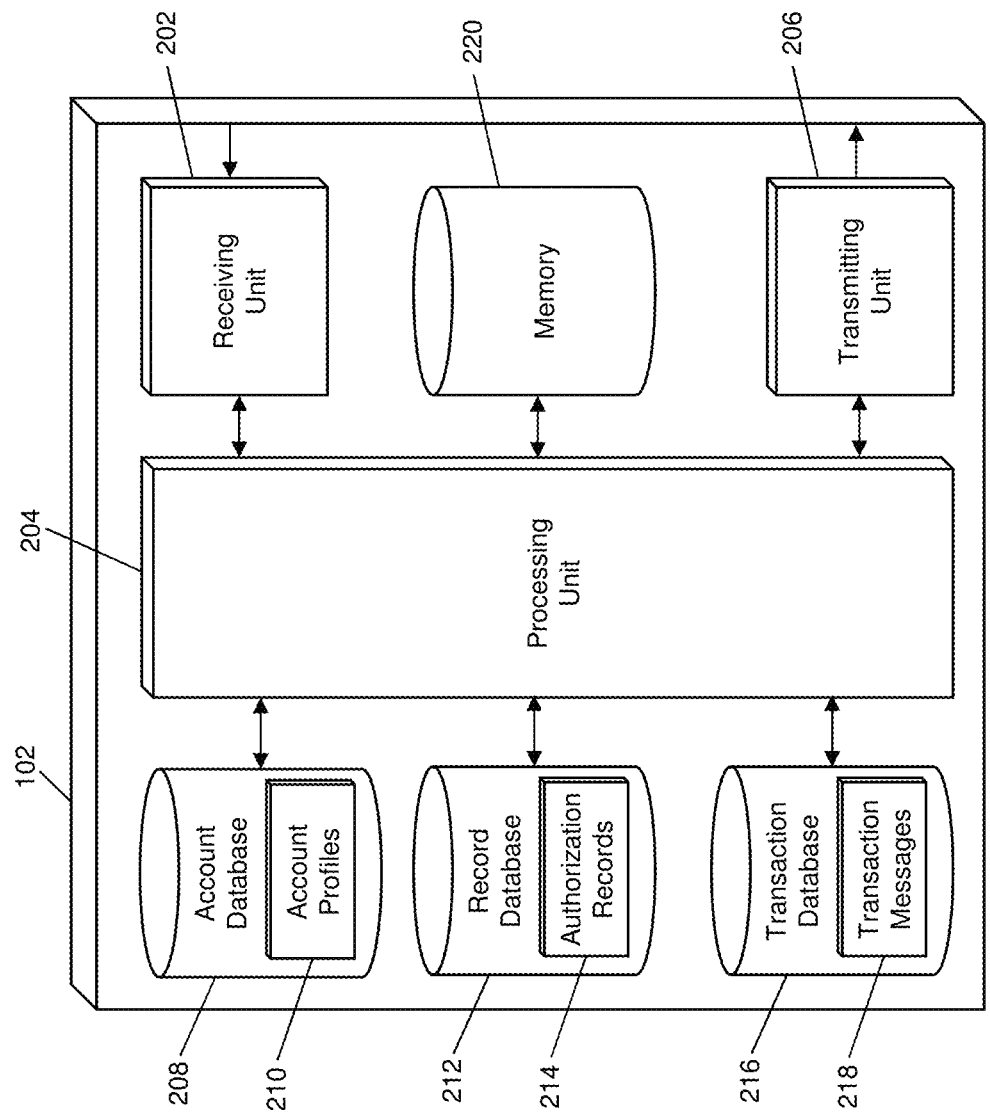
FIG. 2 is a block diagram illustrating the processing server of FIG. 1 for erasing payment transactions post-authorization using reward points in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

The processing server 102 may include a receiving unit 202. The receiving unit 202 may be configured to receive data over one or more networks via one or more network protocols, including the receipt of transaction messages via the payment network 108 that are formatted using associated standards, such as the ISO 8583 standard, and communicated using associated specialized communication protocols. Authorization requests may include a plurality of data elements, including data elements configured to store primary account numbers, transaction amounts, merchant data, product data, and additional data based on the associated standards. The receiving unit 202 may also receive messages from consumers 104, such as via consumer devices 110, using appropriate methods, and may also be configured to receive reward data associated with consumer reward accounts, such as from merchants 106, financial institutions, etc. In some instances, reward accounts may be managed directly by the processing server 102 and/or payment network 108 using methods and systems that will be apparent to persons having skill in the relevant art.

The processing server 102 may also include an account database 208. The account database 208 may be configured to store a plurality of account profiles 210. Each account profile 210 may include data related to a reward account associated with one or more consumers 104, including at least an account identifier, a point amount, and contact information. The account identifier may be a unique value suitable for use in identification of the account profile 210, related reward account, and/or associated consumer(s) 104, such as an identification number, reward account number, transaction account number, username, email address, device identifier, etc. The point amount may be an amount of reward points available for use by the associated consumer(s) 104 to erase payment transactions post authorization.

The contact information may include data suitable for use in contacting the associated consumer 104 and/or a corresponding consumer device 110. The contact information may include, for example, a username, an e-mail address, a phone number, a device identifier (e.g., a registration number, a serial number, a media access control address, an internet protocol address, etc.), or any other type of contact information suitable for performing the functions discussed herein as will be apparent to persons having skill in the relevant art.

The processing server 102 may further include a processing unit 204. The processing unit 204 may be configured to perform the functions of the processing server 102 discussed herein as will be apparent to persons having skill in the relevant art. When the receiving unit 202 receives an authorization request, the processing unit 204 may identify an account identifier stored in a data element included in the authorization request, such as a data element configured to store a primary account number. The processing unit 204 may then identify an account profile 210 stored in the account database 208 that includes the account identifier. The processing unit 204 may be configured to then validate eligibility of the payment transaction for erasure.

Eligibility may be based on data associated with the payment transaction, such as data stored in one or more data elements included in the received authorization request, data included in the identified account profile 210, and additional data, such as associated with a merchant 106 involved in the payment transaction, another financial institution involved in the transaction (e.g., an issuer or acquirer), or other consideration. For example, the transaction may be eligible or ineligible based on a transaction amount stored in a corresponding data element in the authorization request, based on a reward amount in the identified account profile 210, based on a transaction, product, or merchant category stored in one or more data elements in the authorization request, based on a transaction time and/or date stored in a corresponding data element in the authorization request, or a combination thereof.

If the processing unit 204 determines that the transaction is eligible for erasure, the processing unit 204 may be configured to generate an authorization reference key for the transaction. The authorization reference key may be a unique value associated with the payment transaction and the identified account profile 210. In some instances, the authorization reference key may be a transaction identifier, which may be stored in a data element included in the received authorization request. The processing unit 204 may store the authorization reference key in an authorization record 214 in a record database 212 included in the processing server 102.

The record database 212 may be configured to store a plurality of authorization records 214. Each authorization record 214 may include data related to a payment transaction including at least an authorization reference key and one or more unique identifiers. In some instances, each authorization record 214 may be generated and stored in the record database 212 only for transactions eligible for erasure. Authorization records 214 may also include a status indicator, such as indicative of the status of an erasure. The status may include awaiting a response from the consumer 104, erasure initiated, erasure completed, rebate received, response period expired, etc. Authorization records 214 may also include additional data associated with the corresponding payment transaction, such as a transaction amount and/or the authorization request.

In some embodiments, an authorization record 214 may include a point cost. In such an embodiment, the processing unit 204 may be configured to calculate a reward point cost for erasure of a payment transaction. The reward point cost may be based on the transaction amount for the payment transaction and one or more conversion rates. Conversion rates may be based on the involved merchant 106, an involved financial institution, the reward account, products being purchased in the payment transaction, or other suitable criteria that will be apparent to persons having skill in the relevant art.

The processing unit 204 may also be configured to generate unique identifiers. The processing unit 204 may generate a unique identifier for an authorization record 214 for a payment transaction that is eligible for erasure. In some instances, a single unique identifier may be generated for each authorization record. In other instances, multiple unique identifiers may be generated, such as one uniquely associated with each message to be transmitted to a consumer 104. For example, if the processing server 102 transmits multiple erasure notifications to a consumer 104, each may be associated with a unique identifier. In another example, if an account profile 210 is associated with multiple consumers 104, a different erasure notification may be transmitted to each consumer 104, with each notification including a different unique identifier.

The processing unit 204 may store unique identifiers in the associated authorization records 214. Once an authorization reference key and unique identifier are generated for an eligible transaction, the processing unit 204 may generate an erasure notification. The erasure notification may include at least the unique identifier and one or more transaction details for the payment transaction, such as the transaction amount or the point cost, and any additional suitable data, such as an expiration time and/or date. The erasure notification may be transmitted to the consumer 104 using the contact information stored in the identified account profile 210 by a transmitting unit 206. The transmitting unit 206 may be configured to transmit data over one or more networks via one or more network protocols, including the transmission of transaction messages via the payment network 108 using associated communication protocols.

The consumer 104 may receive the erasure notification via their consumer device 110 and may provide a response to the processing server 102. The response may be received by the receiving unit 202 using a suitable method. In some embodiments, the response may include only the unique identifier. In other embodiments, the response may include additional information, such as a confirmation from the consumer 104, authentication data, a partial erasure amount, etc. The processing unit 204 may identify the data included in the response and may process the erasure accordingly.

Processing of the erasure may include the generating of a transaction message for a rebate transaction to rebate a transaction account associated with the consumer 104 for the transaction amount or for an amount indicated by the consumer 104 in the response. The generated transaction message may be transmitted to the payment network 108 by the transmitting unit 206 for processing, or may be processing directly by the processing server 102 in instances where the processing server 102 may be a part of the payment network 108 and configured to perform the traditional functions thereof. The processing unit 204 may also be configured to deduct reward points from the point amount stored in the identified account profile 210. The processing unit 204 may use the associated authorization record 214, identified via the unique identifier included in the response, to identify the appropriate account profile 210 for deduction in instances where multiple responses may be received.

In some embodiments, the processing unit 204 may perform additional validation prior to initiation of erasure of a transaction. For instance, the processing unit 204 may identify if the ability for the consumer 104 to erase the transaction has expired (e.g., based on a time and/or date stored in the authorization record 214), if the consumer 104 no longer has the required amount of points available (e.g., due to other erasures or uses of the reward points), etc. In instances where the erasure may no longer be valid, the transmitting unit 206 may transmit a notification to the consumer device 110 indicating such. In some embodiments, if the erasure is validated and is successfully performed, the transmitting unit 206 may transmit a notification to the consumer device 110.

The processing server 102 may also include a memory 220. The memory 220 may be configured to store data for the processing server 110 suitable for performing the functions disclosed herein. For example, the memory 220 may be configured to store standards data for the communication and analysis of transaction messages, conversion rates for reward points, communication data for communications with consumer devices, rules and algorithms for validating transactions and reward accounts, etc. Additional data that may be stored in the memory 220 will be apparent to persons having skill in the relevant art.

In some embodiments, the processing server 102 may also include a transaction database 216. The transaction database 216 may be configured to store a plurality of transaction messages 218. Each transaction message 218 may be associated with a payment transaction and may be formatted pursuant to one or more standards associated with the interchange of transaction messages, such as the ISO 8583 standard. Each transaction message 218 may include a plurality of data elements configured to store data including account identifiers, transaction amounts, transaction time and/or dates, and other suitable data. In some embodiments, a transaction message 218 may also be stored with an associated authorization reference key.

Erasure of Payment Transactions Post-Authorization

Figure 3:
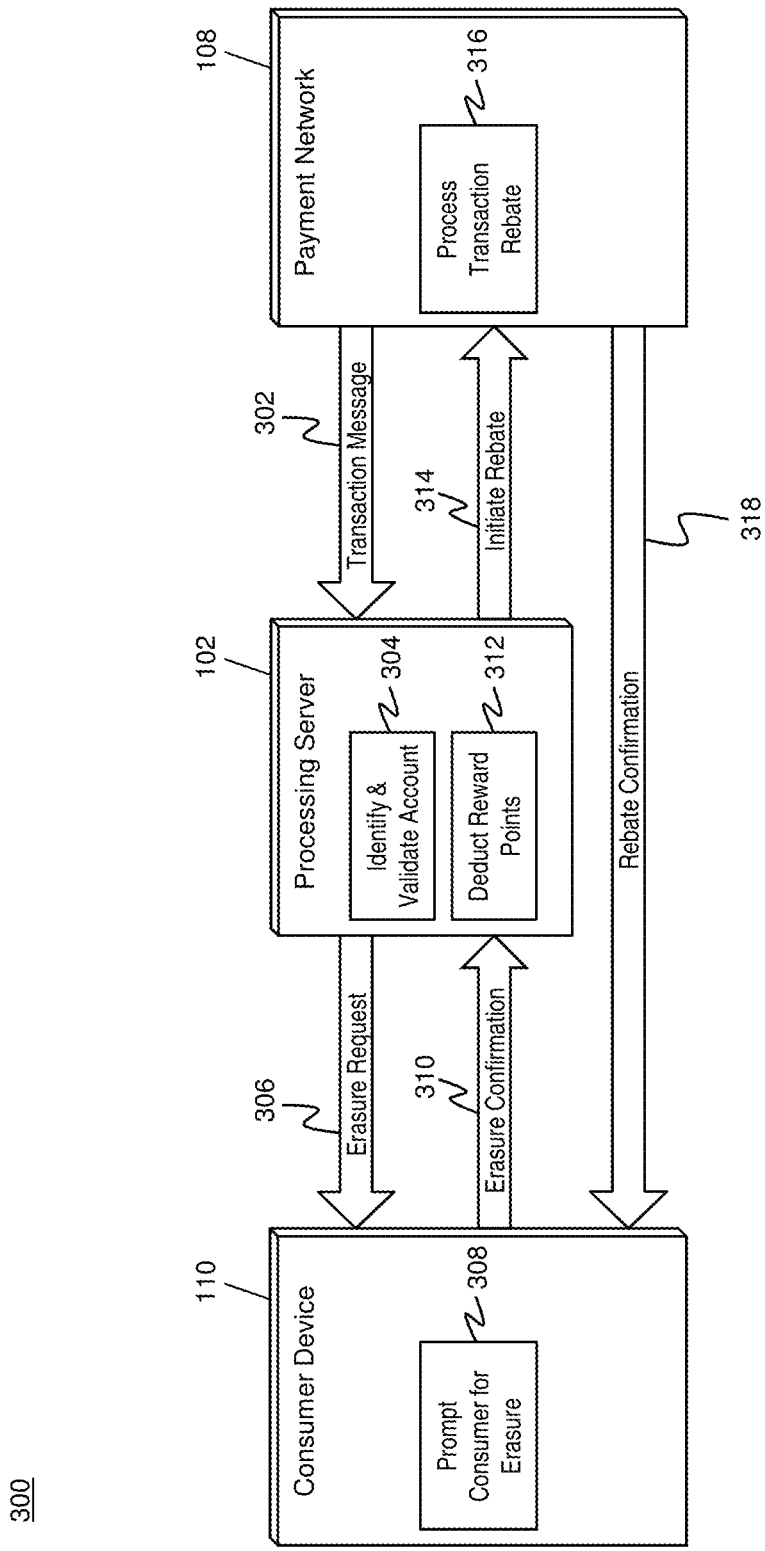
FIG. 3 is a flow diagram illustrating a process for erasing payment transactions post-authorization using reward points using the system of FIG. 1 in accordance with exemplary embodiments.

FIG. 3 illustrates a process 300 for the erasure of payment transactions post-authorization using the system 100.

In step 302, the payment network 108 may forward a transaction message for a payment transaction to the processing server 102, to be received by the receiving unit 202. The transaction message may be formatted based on one or more standards and include a plurality of data elements, including at least a first data element configured to store a primary account number that includes an account identifier and a second data element configured to store a transaction amount. The corresponding payment transaction may be post-authorization, but may have not yet cleared or settled.

In step 304, the processing unit 204 of the processing server 102 may identify and validate a reward account for erasure of the payment transaction. The reward account may be identified via identification of an account profile 210 stored in the account database 208 that includes the account identifier included in the first data element included in the received authorization request. The validation may be based on data included in the identified account profile 210 and the received authorization request, such as the reward amount included in the identified account profile 210 corresponding to the transaction amount stored in the second data element included in the received authorization requests. In some embodiments, the validation may include calculation of a point cost by the processing unit 204, for use in corresponding the reward amount to the transaction amount.

In step 306, an erasure request may be transmitted by the transmitting unit 206 of the processing server 102 to the consumer device 110. The erasure request may be generated by the processing unit 204 and include at least a unique identifier and any additional data, such as an expiration data, a transaction amount, a point cost, etc. Generation of the erasure request may also include the generation of an authorization reference key and the unique identifier, which may be stored in an authorization record 214 in the record database 212. The transmitting unit 206 may transmit the request to the consumer device 110 using contact information stored in the identified account profile 210.

In step 308, the consumer device 110 may prompt the consumer 104 for erasure. The prompt may include the display of the erasure request to the consumer 104 and the prompting or a response to be entered by the consumer 104 to initiate erasure. In step 310, the consumer device 110 may transmit an erasure confirmation to the processing server 102, to be received by the receiving unit 202. The erasure confirmation may include at least the unique identifier that had been included in the erasure request transmitted in step 306.

In step 312, the processing unit 204 may identify the account profile 210 again based on information stored in the authorization record 214 (e.g., the authorization reference key) that includes the unique identifier included in the erasure confirmation, and may deduct the point cost from the reward amount stored in the account profile 210. In embodiments where partial erasure may be available to the consumer 104, the deducted reward amount may be based on an amount included in the received erasure confirmation.

In step 314, the processing server 102 may initiate a rebate with the payment network 108 for rebate of the transaction amount (e.g., or a portion thereof) to the consumer 104. Initiation of the rebate may include the generation of a transaction message, such as an authorization request, for the rebate by the processing unit 204 that includes the transaction amount, an account identifier associated with the consumer 104 (e.g., or a transaction account associated thereto), and any other suitable data, and the transmission thereof to the payment network 108 by the transmitting unit 206 of the processing server 102.

In step 316, the payment network 108 may process the rebate using methods and systems that will be apparent to persons having skill in the relevant art. In step 318, a rebate confirmation may be transmitted to the consumer device 110 by the payment network 108 using methods and systems that will be apparent to persons having skill in the relevant art.

Process for Requesting Post-Authorization Erasure of Transaction Payments

Figure 4:
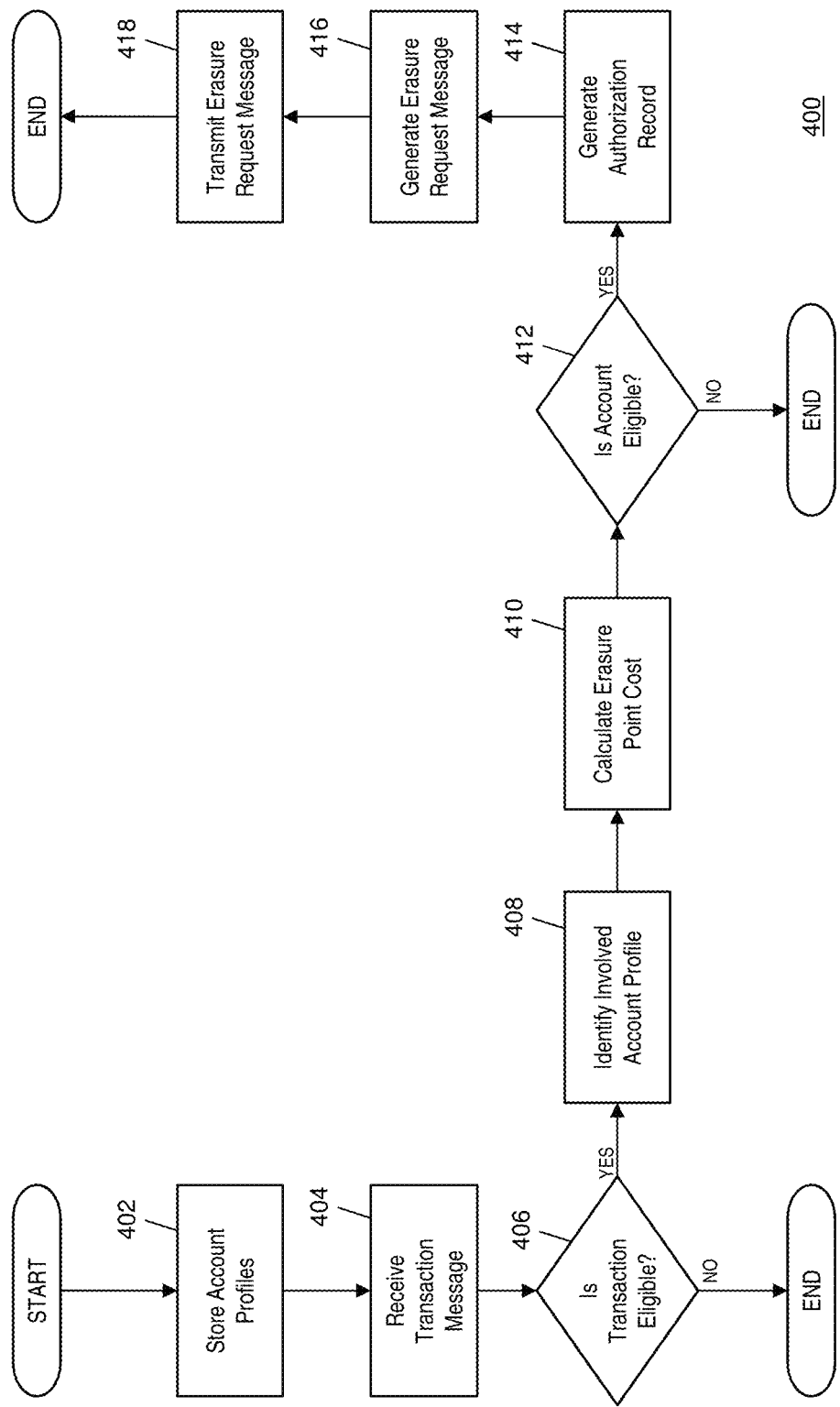
FIG. 4 is a flow diagram illustrating a process for prompting a consumer for post-authorization erasure of a payment transaction in accordance with exemplary embodiments.

FIG. 4 illustrates a process 400 for the validation of a payment transaction and requesting of erasure thereof by the consumer 104 using the processing server 102.

In step 402, account profiles 210 may be stored in the account database 208 of the processing server 112, wherein each account profile 210 includes data related to a reward account including at least an account identifier, a point amount, and contact information. In step 404, the receiving unit 202 of the processing server 102 may receive a transaction message for a payment transaction. The transaction message may be formatted based on one or more standards and may include a plurality of data elements, including data elements configured to store a specific account identifier and a transaction amount.

In step 406, the processing unit 204 of the processing server 102 may determine if the transaction is eligible for erasure. The determination may be based on data stored in the plurality of data elements included in the received authorization request and additional data, such as requirements set forth by the merchant 106, a financial institution, the processing server 102, the payment network 108, etc. For instance, the merchant 106 involved in the payment transaction may prohibit erasure for transactions under ten dollars. In another example, an issuing bank may prohibit erasure for transactions involving gambling. If the transaction is determined to be ineligible for erasure, the process 400 may be completed.

If the transaction is determined to be eligible, then, in step 408, the processing unit 204 may identify the account profile 210 for the reward account involved in the transaction. The account profile 210 may be identified based on inclusion of the specific account identifier stored in a data element included in the received authorization request. In step 410, the processing unit 204 may calculate the point cost for erasure of the payment transaction. The point cost may be based on the transaction amount stored in a data element included in the received authorization request and, in some instances, a conversion rate. In some embodiments, the point cost may have been previously calculated by the processing unit 204 in step 406 while determining transaction eligibility.

In step 412, the processing unit 204 may determine if the reward account is eligible for erasure of the transaction. The determination may be based on a correspondence between the calculated point cost and the reward amount available in the identified account profile 210, and any additional information stored in the identified account profile 210. If the reward account is not eligible for erasure of the transaction, then the process 400 may be completed. If the reward account is eligible, then, in step 414, the processing unit 204 may generate an authorization record 214. Generation of the authorization record may include generation of an authorization reference key associated with the payment transaction and the identified account profile 210 and generation of a unique identifier associated with the authorization reference key. The authorization record 214 may be stored in the record database 212. In some embodiments, the authorization record 214 may also include an expiration time and/or date, a status indicator, the point cost, and/or the received transaction message or data included therein.

In step 416, the processing unit 204 may generate an erasure request message. The erasure request message may include at least the unique identifier and the calculated point cost and/or the transaction amount stored in the data element in the authorization request. In some embodiments, the erasure request message may include additional data, such as response instructions, the expiration time and/or date, etc. In step 418, the transmitting unit 206 of the processing server 102 may transmit the erasure request message to the consumer device 110 associated with the reward account using the contact information included in the identified account profile 210.

Processing of Post-Authorization Erasure of Transaction Payments

Figure 5:
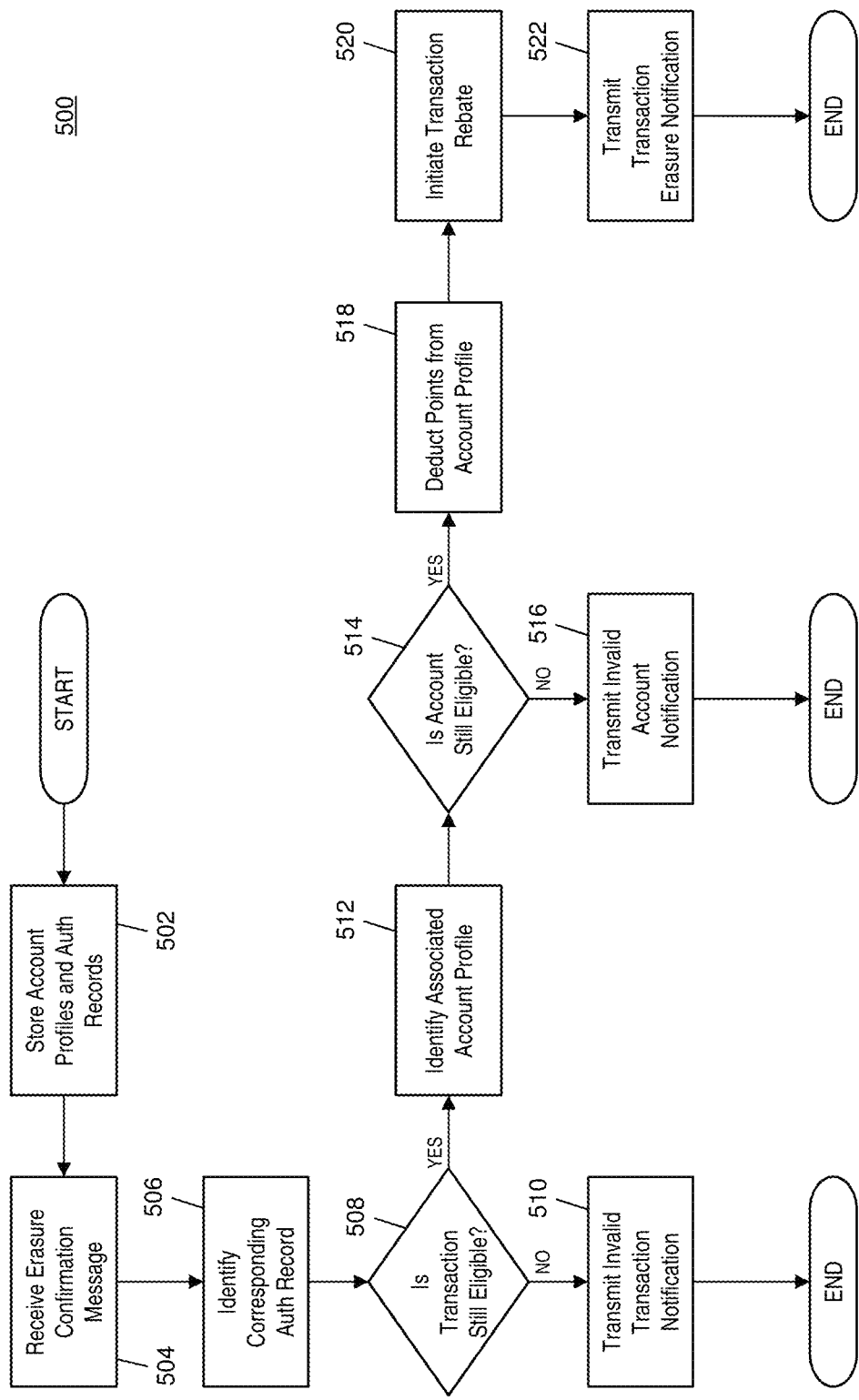
FIG. 5 is a flow diagram illustrating a process for confirmation and erasure of a payment transaction post-authorization using reward points in accordance with exemplary embodiments.

FIG. 5 illustrates a process 500 for the post-authorization erasure of transaction payments following confirmation from the consumer 104 using the processing server 102.

In step 502, the processing server 102 may store account profiles 210 in the account database 208 and authorization records 214 in the record database 208. Each account profile 210 may include data related to a reward account including at least an account identifier, a point amount, and contact information. Each authorization record 214 may include data related to a payment transaction including at least an authorization reference key associated with the transaction and a specific account profile and a unique identifier. In some embodiments, each authorization record 214 may also include a point cost, a transaction message, a status indicator, and/or an expiration time and/or date.

In step 504, the receiving unit 202 of the processing server 102 may receive an erasure confirmation message from a consumer device 110. The erasure confirmation message may include at least a specific unique identifier. In some embodiments, the erasure confirmation message may also include an erasure amount, which may correspond to a currency amount or a reward point amount. In step 506, the processing unit 204 of the processing server 102 may identify an authorization record 214 corresponding to the erasure confirmation message based on inclusion of the specific unique identifier.

In step 508, the processing unit 204 may determine if the corresponding payment transaction is still eligible for erasure. The determination may be made based on a status indicator included in the identified authorization record 214 or an expiration time and/or date included in the identified authorization record 214. For example, if the status indicator indicates that the transaction was already erased, or if the available time period for erasure has expired, the transaction may no longer be eligible, such as to prevent multiple rebates on a single transaction or to prohibit interference with clearing and settlement processes.

If the transaction is determined to be ineligible for erasure, then, in step 510, the transmitting unit 206 of the processing server 102 may transmit a notification to the consumer device 110 that indicates that the transaction is no longer valid. In some embodiments, the notification may include a message that indicates a reason for the invalidation (e.g., that the time period expired). If the transaction is determined to be eligible, then, in step 512, the processing unit 204 may identify an account profile 210 associated with the payment transaction to be erased. The account profile 210 may be identified based on the authorization reference key included in the identified authorization record and the account identifier stored in the account profile 210.

In step 514, the processing unit 204 may determine if the account is still eligible for erasure of the payment transaction. The determination may be based on the current in reward amount and any additional data and/or settings included in the identified account profile 210. For instance, if the consumer 104 spent reward points in between the sending of the erasure request and receipt of the erasure confirmation message, the reward account may lose eligibility for erasure of the transaction (e.g., due to insufficient reward points). If the account is no longer eligible, then, in step 516, the transmitting unit 206 may transmit a notification to the consumer device 110 that indicates that the account is no longer eligible. In some embodiments, the notification may include a message indicating the reasoning.

If, in step 514, the processing unit 204 determines that the reward account is eligible, then, in step 518, the processing unit 204 may deduct the point cost from the reward amount included in the identified account profile 210. In some embodiments, the point cost may be included in the identified authorization record 214. In other embodiments, the point cost may be calculated by the processing unit 204 using the methods discussed herein. In step 520, the processing unit 204 may generate a transaction message for a rebate for the payment transaction for the transaction amount (e.g., or for a lesser amount as indicated in the erasure confirmation message), which may be transmitted by the transmitting unit 206 to the payment network 108 for processing. In some embodiments, initiation of the rebate may include the updating of a status indicator included in the identified authorization record 214, such as to indicate that the rebate is being processed. In step 522, the transmitting unit 206 may transmit a notification to the consumer device 110 confirming that the transaction is being erased.

Graphical User Interface

Figure 6B:
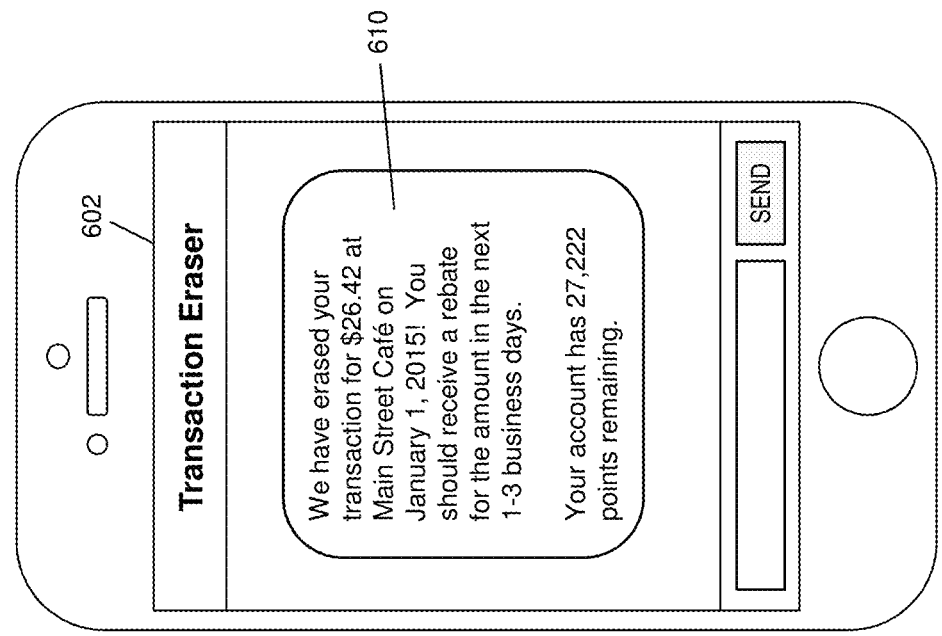
FIGS. 6A and 6B are diagrams illustrating exemplary graphical user interfaces of a consumer device for post authorization erasure of payment transactions using reward points in accordance with exemplary embodiments.
Figure 6A:
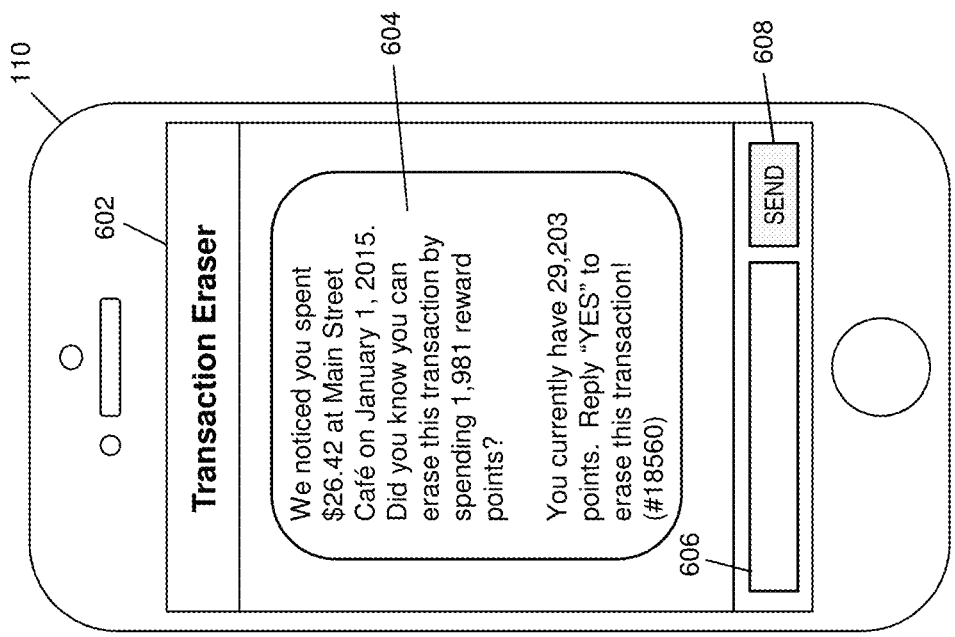

FIGS. 6A and 6B illustrate a graphical user interface of the consumer device 110 for use in the erasure of payment transactions post authorization using reward points. It will be apparent to persons having skill in the relevant art that the interfaces illustrated in FIGS. 6A and 6B and discussed herein are provided as illustration only, and that additional and/or alternative interfaces may be used in accomplishing the methods and systems discussed herein.

The consumer device 110 may include a display 602. The display 602 may be configured to display data to a user of the consumer device 110, such as the consumer 104, using methods and systems that will be apparent to persons having skill in the relevant art. As illustrated in FIG. 6A, the display 602 may be configured to display an application program for the receipt and transmission of messages, such as short messaging service messages. The display 602 may display an erasure request message 604.

The erasure request message 604 may include at least the unique identifier associated with the corresponding payment transaction, illustrated in FIG. 6A as an identification number with a value of 18560. The erasure request message 604 may also include transaction data, such as the transaction amount ($26.42), the merchant name (Main Street Café), and the transaction date (Jan. 1, 2015). The erasure request message 604 may also include a calculated point cost (1,918 points) as well as account data, such as available reward points (29,203 points). The erasure request message 604 may also include response instructions. As illustrated in FIG. 6A, if the consumer 104 wants to confirm erasure of the transaction, they are asked to respond to the erasure request message with a message of "YES."

The display 602 may also display an input 606 and a send button 608. The input 606 may be used to receive input from the user of the consumer device 110, such as text that may be entered via one or more input devices. The send button 608 may, when interacted with by the user, send the content of the input 606 in a response message as a response to the received erasure request message 604. If the consumer 104 wants to erase the indicated payment transaction, the consumer 104 may enter "YES" into the input 606 and interact with the send button 608. In some embodiments, the consumer 104 may also send the unique identifier in the response message.

FIG. 6B illustrates the receipt of an erasure confirmation message 610, such as received following the response of the consumer 104 to the erasure request message 604 with a "YES" message. The erasure confirmation message 610 may include confirmation data, such as transaction data that confirms which transaction was erased (e.g., the transaction amount, transaction date, and merchant name as illustrated in FIG. 6B), as well as account data, such as the reward points remaining for the reward account following erasure.

Figure 7:
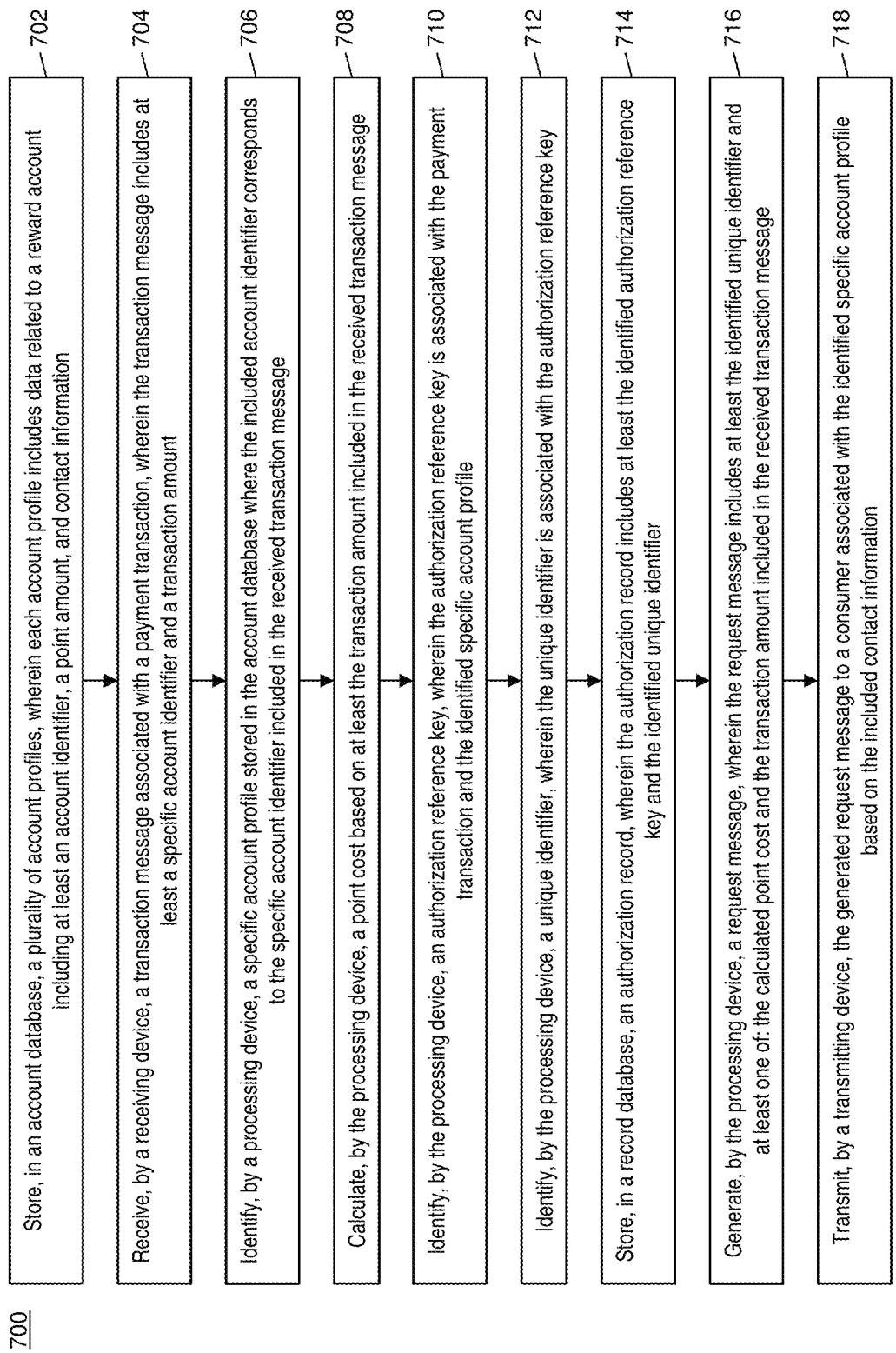
FIG. 7 is a flow chart illustrating an exemplary method for confirming post-authorization erasure of a transaction payment using reward points in accordance with exemplary embodiments.

Exemplary Method for Confirming Post-Authorization Erasure of a Transaction Payment Using Reward Points FIG. 7 illustrates a method 700 for prompting a consumer for confirmation of erasure of a transaction payment post authorization of the transaction using reward points.

In step 702, a plurality of account profiles (e.g., account profiles 210) may be stored in an account database (e.g., the account database 208), wherein each account profile 210 includes data related to a reward account including at least an account identifier, a point amount, and contact information. In step 704, a transaction message associated with a payment transaction may be received by a receiving device (e.g., the receiving unit 202), wherein the transaction message includes at least a specific account identifier and a transaction amount. In one embodiment, the associated payment transaction has been authorization but has not been cleared.

In step 706, a specific account profile 210 stored in the account database 208 may be identified by a processing device (e.g., the processing unit 204) where the included account identifier corresponds to the specific account identifier included in the received transaction message. In step 708, a point cost may be calculated by the processing device 204 based on at least the transaction amount included in the received transaction message. In step 710, an authorization reference key may be identified by the processing device 204, wherein the authorization reference key is associated with the payment transaction and the identified specific account profile 210.

In step 712, a unique identifier may be identified by the processing device 204, wherein the unique identifier is associated with the authorization reference key. In step 714, an authorization record (e.g., authorization record 214) may be stored in a record database (e.g., the record database 212), wherein the authorization record 214 includes at least the identified authorization reference key and the identified unique identifier. In step 716, a request message may be generated by the processing device 204, wherein the request message includes at least the identified unique identifier and at least one of: the calculated point cost and the transaction amount included in the received transaction message.

In step 718, the generated request message may be transmitted by a transmitting device (e.g., the transmitting unit 206) to a consumer (e.g., the consumer 104) associated with the identified specific account profile 210 based on the included contact information. In some embodiments, the generated request message may not be transmitted to the consumer 104 if the point amount included in the identified specific account profile 210 is less than the calculated point cost. In one embodiment, the method 700 may further include validating, by the processing device 204, the associated payment transaction as an eligible payment transaction based on transaction data further included in the received transaction message.

In some embodiments, the method 700 may also include validating, by the processing device 204, the identified specific account profile 210 as eligible for erasure of the transaction amount included in the received transaction message based on at least one of: account data further included in the identified specific account profile 210 and a comparison of the calculated point cost and the point amount included in the identified specific account profile 210. In one embodiment, the method 700 may further include: receiving, by the receiving device 202, an erasure confirmation from the consumer 104 in response to the transmitted request message; deducting, by the processing device 204, the point cost from the point amount included in the identified specific account profile 210; and transmitting, by the transmitting device 206, an authorization transaction message requesting a rebate of the transaction amount for the associated payment transaction to a payment network (e.g., the payment network 108).

Figure 8:
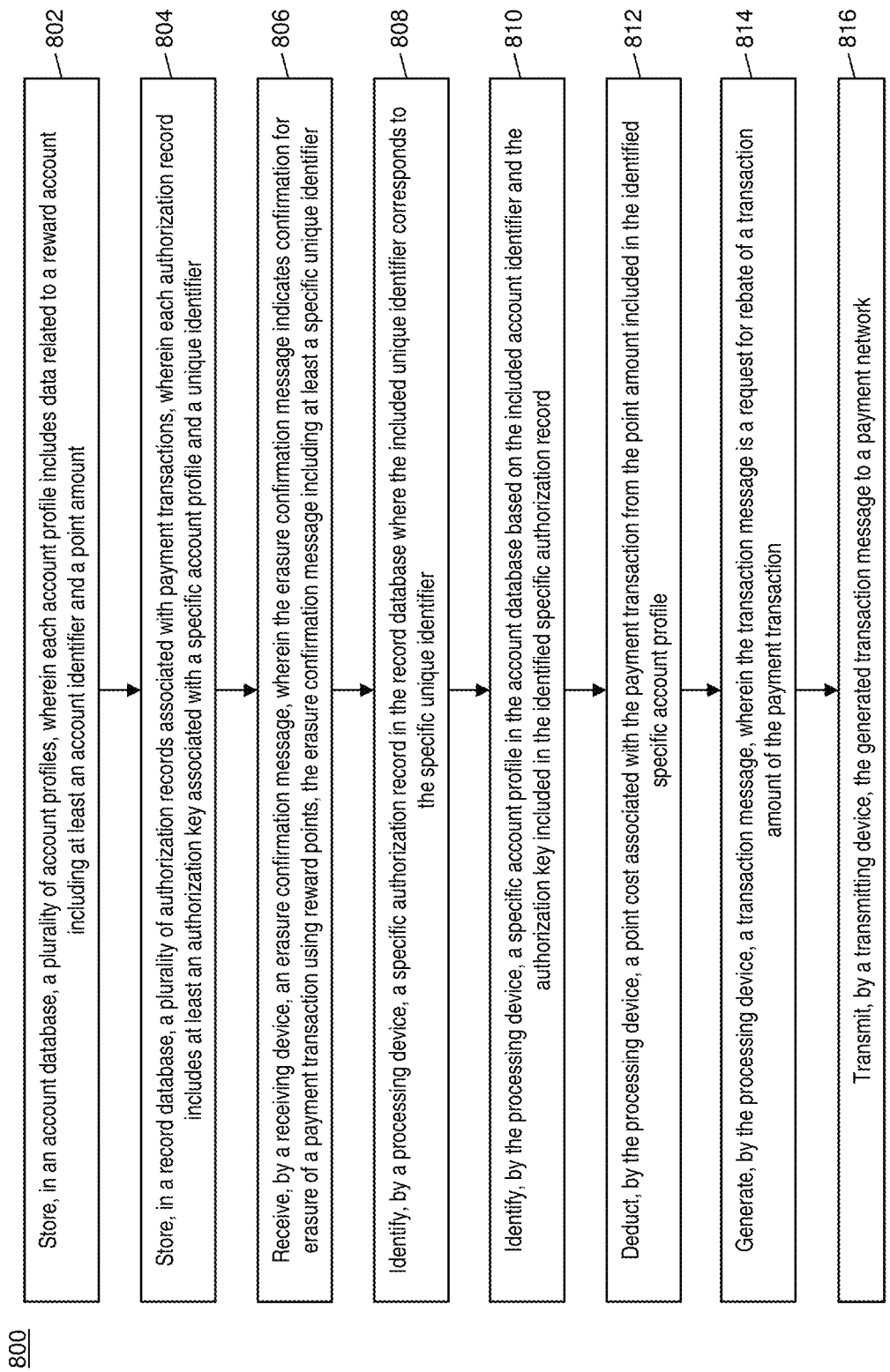
FIG. 8 is a flow chart illustrating an exemplary method for post-authorization erasure of a transaction payment using reward points in accordance with exemplary embodiments.

Exemplary Method for Post-Authorization Erasure of a Transaction Payment Using Reward Points FIG. 8 illustrates a method 800 for the erasure of a transaction payment post authorization using reward points based on a consumer instruction.

In step 802, a plurality of account profiles (e.g., account profiles 210) may be stored in an account database (e.g., the account database 208), wherein each account profile 210 includes data related to a reward account including at least an account identifier and a point amount. In step 804, a plurality of authorization records (e.g., authorization records 214) associated with payment transactions may be stored in a record database (e.g., the record database 212), wherein each authorization record 214 includes at least an authorization key associated with a specific account profile 210 and a unique identifier.

In step 806, an erasure confirmation message may be received by a receiving device (e.g., the receiving unit 202), wherein the erasure confirmation message indicates confirmation for erasure of a payment transaction using reward points, the erasure confirmation message including at least a specific unique identifier. In step 808, a specific authorization record 214 in the record database 212 may be identified by a processing device (e.g., the processing unit 204) where the included unique identifier corresponds to the specific unique identifier.

In step 810, a specific account profile 210 in the account database 208 may be identified by the processing device 204 based on the included account identifier and the authorization key included in the identified specific authorization record 214. In step 812, a point cost associated with the payment transaction may be deducted, by the processing device 204, from the point amount included in the identified specific account profile 210. In one embodiment, the identified specific authorization record 214 may include the point cost.

In step 814, a transaction message may be generated by the processing device 204, wherein the transaction message is a request for rebate of a transaction amount of the payment transaction. In step 816, the generated transaction message may be transmitted by a transmitting device (e.g., the transmitting unit 206) to a payment network (e.g., the payment network 108). In some embodiments, the identified specific authorization record 214 may further include a received transaction message, the received transaction message including at least a transaction amount, and the method 800 may further include calculating, by the processing device 204, a point cost based on at least the transaction amount included in the received transaction message included in the identified specific authorization record.

In one embodiment, each authorization record 214 may further include a status identifier. In a further embodiment, the method 800 may further include validating, by the processing device 204, the payment transaction as an eligible payment transaction based on the status identifier included in the identified specific authorization record 214. In another further embodiment, the method 800 may also include updating, in the identified specific authorization record 214, the status identifier to indicate that the associated payment transaction has been erased.

In some embodiments, the method 800 may further include validating, by the processing device 204, the identified specific account profile 210 as eligible for erasure of the payment transaction based on the point amount included in the identified specific account profile 210 and the point cost. In one embodiment, the method 800 may also include transmitting, by the transmitting device 206, a confirmation message to a consumer (e.g., the consumer 104), associated with the identified specific account profile 210, wherein the confirmation message indicates erasure of the payment transaction.

Computer System Architecture

Figure 9:
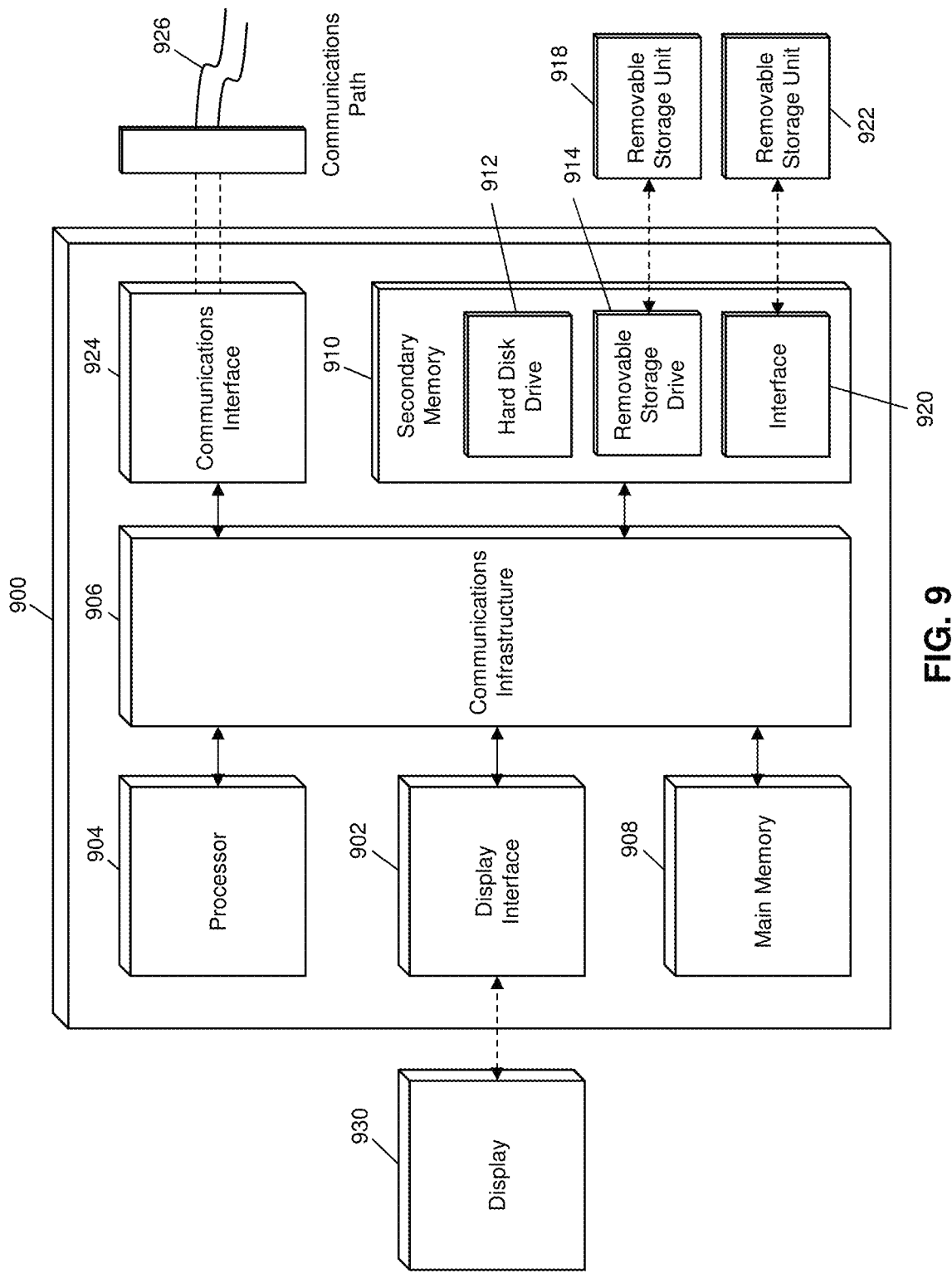
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the processing server 102 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5, 7, and 8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-5, 7, and 8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

Techniques consistent with the present disclosure provide, among other features, systems and methods for post-authorization erasure of transaction payments using reward points. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for confirming post-authorization erasure of a transaction payment using reward points, comprising:

storing, in an account database, a plurality of account profiles, wherein each account profile includes data related to a reward account including at least an account identifier, a point amount, and contact information;

receiving, by a receiving device of a processing server over a payment network, an authorization request associated with a payment transaction, which has been authorized but has not cleared, involving an electronic transfer of funds, wherein the authorization request is a transaction message for a completed transaction and includes at least a specific account identifier and a transaction amount of funds;

identifying, by a processing device of the processing server, a specific account profile stored in the account database where the included account identifier corresponds to the specific account identifier included in the received authorization request;

calculating, by the processing device of the processing server, a point cost based on at least the transaction amount included in the authorization request;

generating, by the processing device of the processing server, an authorization reference key, wherein the authorization reference key identifies the payment transaction and the identified specific account profile;

generating, by the processing device of the processing server, a unique identifier, wherein the unique identifier is associated with the authorization record;

storing, in a record database via the processing server, an authorization record, wherein the authorization record includes at least the authorization reference key and the unique identifier;

generating, by the processing device of the processing server, a request message, wherein the request message includes at least the unique identifier, the authorization reference key, and at least one of: the calculated point cost and the transaction amount of funds included in the received authorization request;

transmitting, by a transmitting device of the processing server, the generated request message to a computing device associated with the identified specific account profile based on the included contact information;

receiving, by the receiving device of the processing server, an erasure confirmation from the computing device in response to the transmitted request message;

selecting, by the processing device of the processing server, the specific account profile in the erasure confirmation based on the authorization reference key and the unique identifier;

deducting, by the processing device of the processing server, the point cost from the point amount included in the identified specific account profile; and transmitting, by the transmitting device of the processing server over the payment network, an authorization transaction message requesting a rebate of the transaction amount of funds for the associated payment transaction to a payment network.

2. The method of claim 1, further comprising:

validating, by the processing device, the associated payment transaction as an eligible payment transaction based on transaction data further included in the received authorization request.

3. The method of claim 1, further comprising:

validating, by the processing device of the processing server, the identified specific account profile as eligible for erasure of the transaction amount of funds included in the received authorization request based on at least one of: account data further included in the identified specific account profile and a comparison of the calculated point cost or the point amount included in the identified specific account profile.

4. The method of claim 1, wherein the generated request message is not transmitted to the consumer if the point amount included in the identified specific account profile is less than the calculated point cost.

5. A system for confirming post-authorization erasure of a transaction payment using reward points, comprising:

a record database;

an account database configured to store a plurality of account profiles, wherein each account profile includes data related to a reward account including at least an account identifier, a point amount, and contact information; and a processor server configured to include:

a receiving device configured to receive an authorization request associated with a payment transaction, which has been authorized but has not cleared, involving an electronic transfer of funds, wherein the authorization request is a transaction message for a completed transaction and includes at least a specific account identifier and a transaction amount of funds;

a processing device configured to:

identify a specific account profile stored in the account database where the included account identifier corresponds to the specific account identifier included in the received authorization request, calculate a point cost based on at least the transaction amount of funds included in the received authorization request, generate an authorization reference key, wherein the authorization reference key identifies the payment transaction and the identified specific account profile, generate a unique identifier, wherein the unique identifier is associated with the authorization record, store, in the record database, an authorization record, wherein the authorization record includes at least the authorization reference key and the unique identifier, and generate a request message, wherein the request message includes at least the unique identifier, the authorization reference key, and at least one of: the calculated point cost and the transaction amount included in the received authorization request; and a transmitting device configured to transmit the generated request message to a computing device associated with the identified specific account profile based on the included contact information, wherein the receiving device is further configured to receive an erasure confirmation from the computing device in response to the transmitted request message, the processing device is further configured to:

select the specific account profile in the erasure confirmation based on the authorization reference key and the unique identifier of the request message, and deduct the point cost from the point amount included in the identified specific account profile, and the transmitting device is further configured to transmit an authorization transaction message requesting a rebate of the transaction amount of funds for the associated payment transaction to a payment network.

6. The system of claim 5, wherein the processing device is further configured to validate the associated payment transaction as an eligible payment transaction based on transaction data further included in the received authorization request.

7. The system of claim 5, wherein the processing device is further configured to validate the identified specific account profile as eligible for erasure of the transaction amount of funds included in the received authorization request based on at least one of: account data further included in the identified specific account profile and a comparison of the calculated point cost or the point amount included in the identified specific account profile.

8. The system of claim 5, wherein the generated request message is not transmitted to the consumer if the point amount included in the identified specific account profile is less than the calculated point cost.

* * * * *